Dec. 31, 1935.  V. TIRIMACCO  2,026,291
GRASS COLLECTING DEVICE FOR LAWN MOWERS
Filed Feb. 14, 1934  4 Sheets-Sheet 4
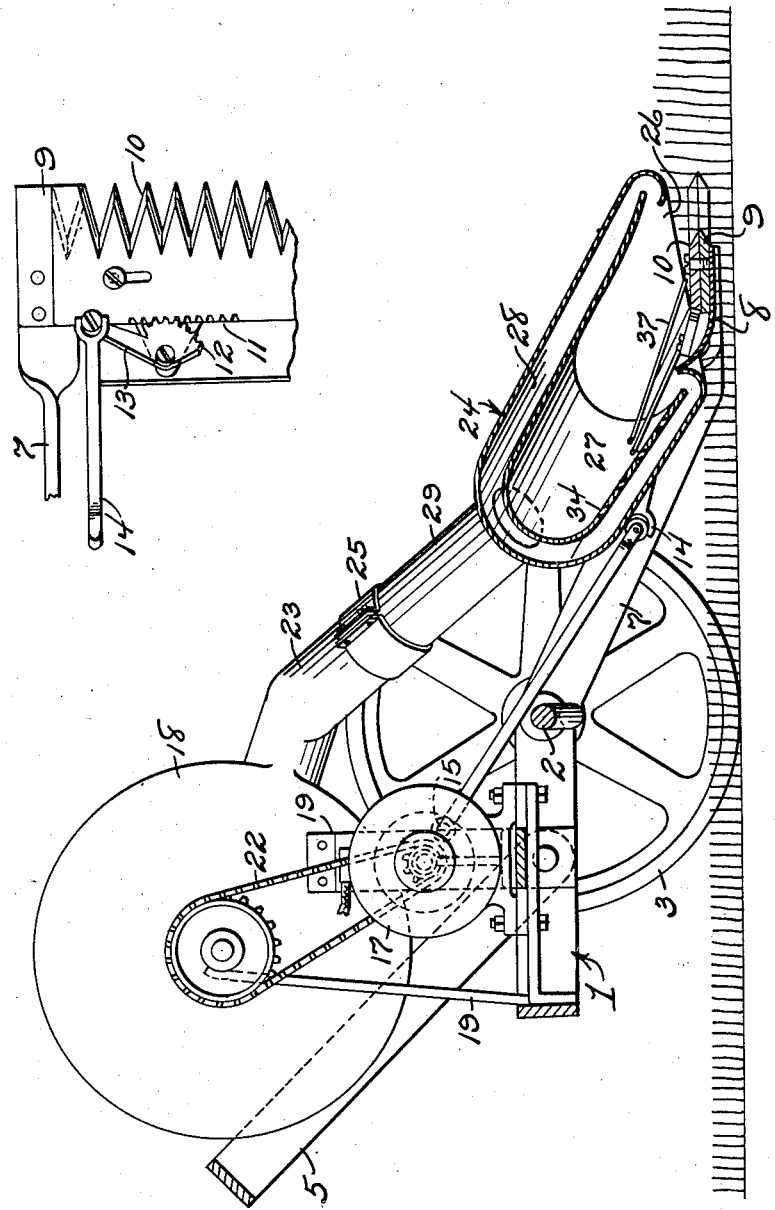
Vincenzo Tirimacco
INVENTOR
BY Victor J. Evans & Co.
ATTORNEY Patented Dec. 31, 1935

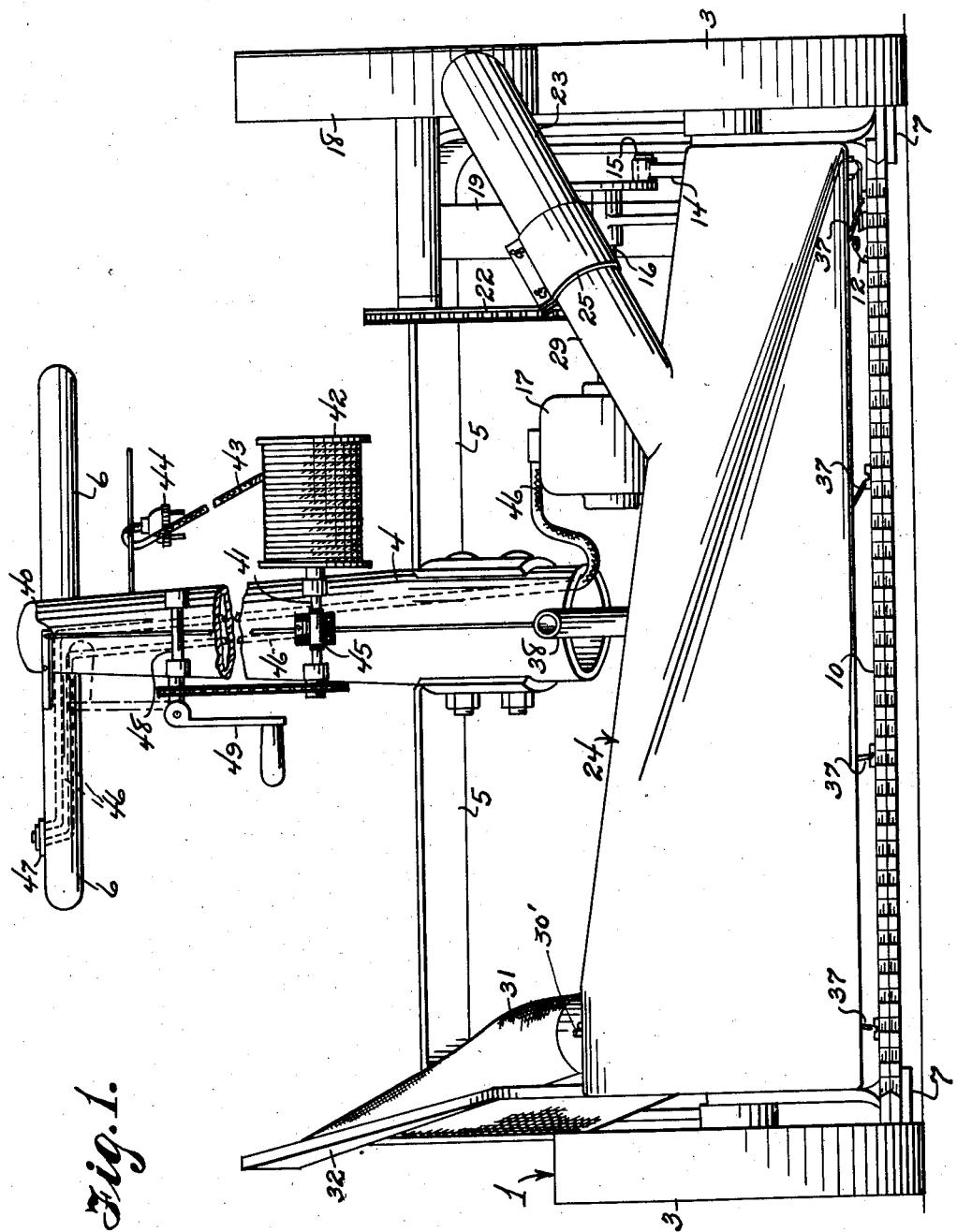

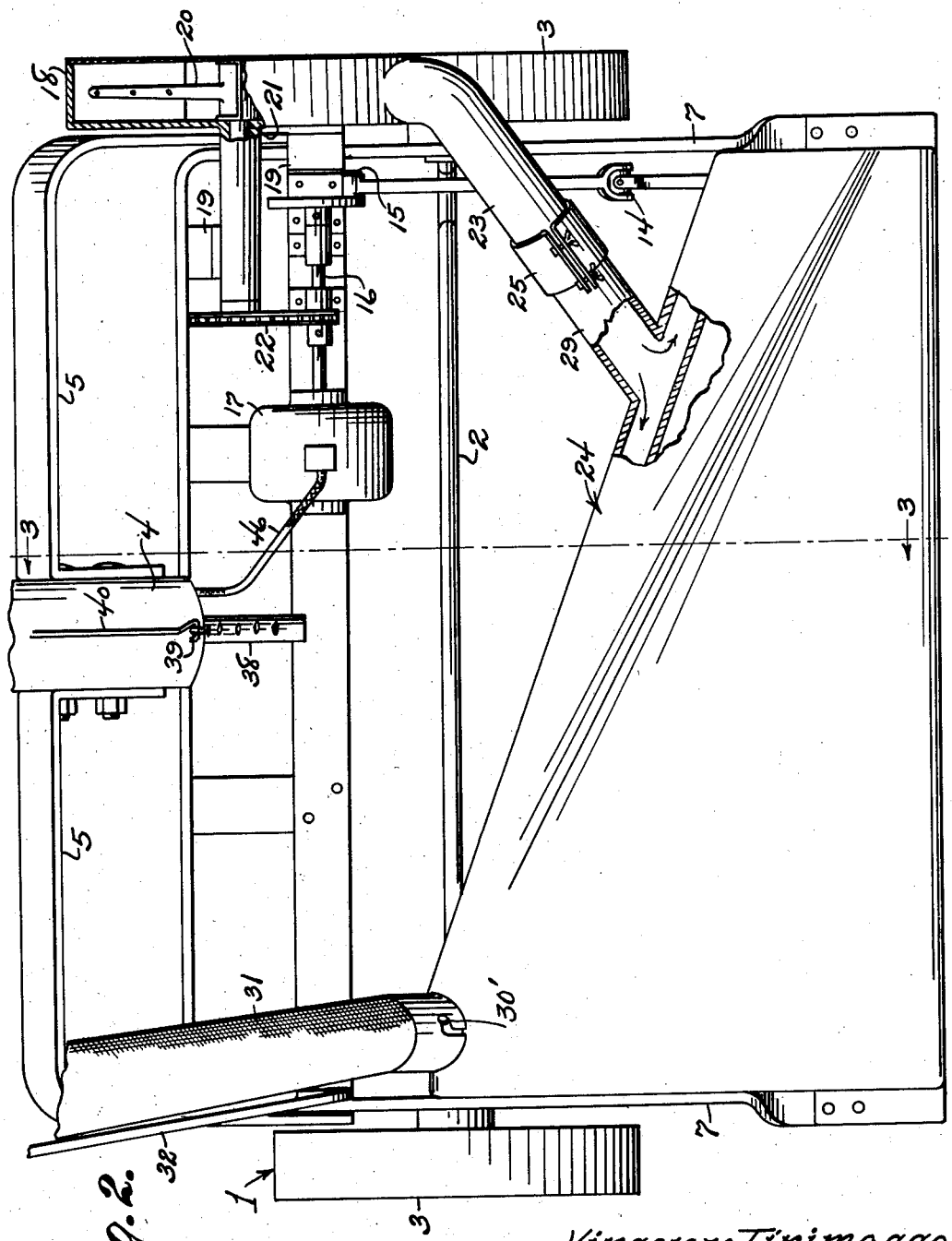

2,026,291

UNITED STATES PATENT OFFICE 2,026,291

GRASS COLLECTING DEVICE FOR LAWN MOWERS

Vincenzo Tirimacco, Turtle Creek, Pa.

Application February 14, 1934, Serial No. 711,231

1 Claim. (Cl. 56—23)

This invention relates to lawn mowers and has for the primary object the provision of a device of the above stated character which is of the power driven type having an air exhausting means for collecting the grass severed by the cutting mechanism and which may be easily and quickly emptied when necessary.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a front elevation illustrating a lawn mower equipped with a grass collecting device constructed in accordance with my invention.

Figure 2 is a fragmentary top plan view illustrating the same.

Figure 3 is a sectional view taken on the line 3—3 of Figure 2.

Figure 4 is a similar view looking in an opposite direction from that shown in Figure 3.

Figure 5 is a fragmentary plan view illustrating the driving means for the movable cutter blade.

Figure 6 is an enlarged fragmentary sectional view showing the grass collecting hood which is associated with the cutting mechanism.

Referring in detail to the drawings, the numeral 1 indicates a main frame carrying an axle 2 on which are journaled ground wheels 3. A handle 4 of tubular formation is secured to the frame 1 by braces 5 and carries at its free end hand grips 6. Extending forwardly and downwardly from the main frame are arms 7 connected by a head or bar 8 on which is mounted a non-movable cutter blade 9. A movable cutter blade 10 is mounted to the non-movable cutter blade 9 for reciprocation and its rear or non-cutting edge is formed to provide rack teeth 11 meshing with a segmental rack 12 pivoted to the bar 8. An angularly disposed arm 13 is integral with the segmental rack 12 and has pivotally connected thereto a pitman 14 which is in turn pivoted to a crank pin 15 secured to a shaft 16 driven by an electric motor 17 mounted upon the main frame 1. A fan casing 18 is supported upon the main frame 1 by a sub-structure 19 and is arranged in alignment with one of the ground wheels. Operating within the casing 18 is a fan 20 secured to a shaft 21, the latter being journaled in bearings carried by the sub-structure. The shaft 21 is connected to the shaft 16 by sprocket gears and sprocket chains, as shown at 22. The fan is driven by the electric motor 17 and forces air through an outlet pipe 23, the latter having connection with a collecting hood 24 by a detachable coupling 25. The hood 24 is suitably supported by the arms 7 with its mouth 26 arranged adjacent to the cutter bars. The hood 24 is divided into inner and outer chambers 27 and 28. The outer chamber is communicative with the neck 29, the latter being connected to the air supply pipe 23. The inner chamber 27 has an outlet neck 30 connected to a collecting bag 31, the latter being supported by an arm 32 mounted to the main frame. The bag 31 is detachably connected to the outlet neck 30 as shown at 30' and is of a conventional construction frequently found used in connection with vacuum cleaners and similar devices being provided with a cover 33 so that the bag may be emptied of its contents whenever necessary. The hood 24 extends the full width of the cutter bars and the walls of the outer chamber of said hood where the mouth of the latter is formed extend inwardly and spaced from the walls of the inner chamber so as to admit air from the outer chamber to the inner chamber adjacent to the mouth of the hood and rearwardly and above the cutter bars. The air entering the inner chamber passes rearwardly and into the collecting bag by way of the neck 30 so that the grass severed by the cutter bars will be drawn rearwardly and deposited into the bag. The lower wall of the inner compartment is provided with a series of apertures 34 to admit air from the outer compartment to the inner compartment and aid in driving the severed grass rearwardly to the collecting bag. The inner and outer chambers are also in communication with each other by ports 35 located adjacent the neck 30 so that air from the outer compartment will be directed into the inner compartment at the formation of the latter with the neck 30 further aiding in driving the severed grass to the collecting bag.

A lubricant reservoir 36 is mounted on the main frame and has connected thereto a series of pipes 37 leading to the cutter bars for the purpose of lubricating the latter. Also additional pipes may be provided from the reservoir to other moving parts of the motor.

The braces 5 which secure the handle to the main frame are pivotally connected to the latter permitting the handle to be adjusted upwardly and downwardly and to hold the handle in any of its adjusted positions, a rack 38 is provided on the main frame and engaged by a spring pressed dog 39 carried by the handle. A suitable Dec. 31, 1935.    L. P. F. VAN DER GRINTEN    2,026,292
COPYING OF OPAQUE ORIGINALS BY CONTACT PRINTING
Filed Sept. 9, 1933    2 Sheets-Sheet 1
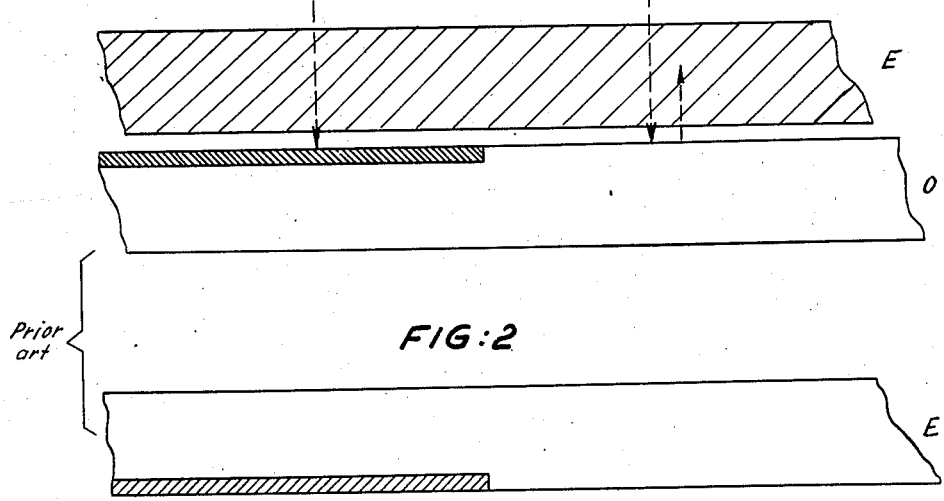
Prior art
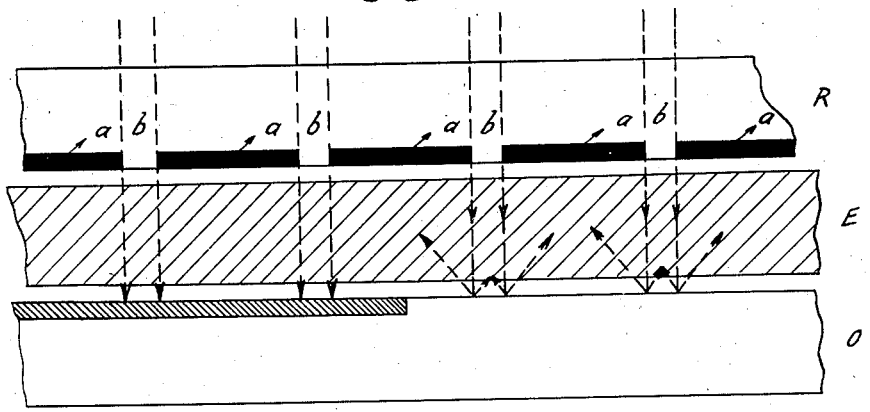
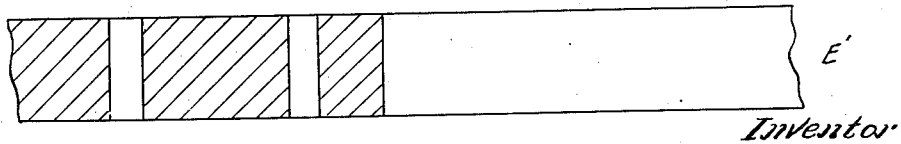
Inventor
L. P. F. Van der Grinten
Wray N. Hoffman
Attorney